United States Patent
Bathina et al.

(10) Patent No.: US 8,220,270 B2
(45) Date of Patent: Jul. 17, 2012

(54) METHOD AND APPARATUS FOR AFFECTING A RECIRCULATION ZONE IN A CROSS FLOW

(75) Inventors: Mahesh Bathina, Andhra Pradesh (IN); Ramanand Singh, Uttar Pradesh (IN)

(73) Assignee: General Electric Company, Schenectady, NY (US)

( * ) Notice: Subject to any disclaimer, the term of this patent is extended or adjusted under 35 U.S.C. 154(b) by 929 days.

(21) Appl. No.: 12/262,358

(22) Filed: Oct. 31, 2008

(65) Prior Publication Data

US 2010/0107641 A1 May 6, 2010

(51) Int. Cl.
*F02C 1/00* (2006.01)
(52) U.S. Cl. .............. 60/737; 60/740; 60/742; 60/748; 239/399; 415/191; 415/211.2
(58) Field of Classification Search .............. 60/737, 60/740, 742, 748, 752, 753, 754, 755, 756, 60/757, 758, 759, 760, 776; 239/399; 415/191, 415/211.2
See application file for complete search history.

(56) References Cited

U.S. PATENT DOCUMENTS

| | | | | |
|---|---|---|---|---|
| 5,251,447 | A * | 10/1993 | Joshi et al. | 60/737 |
| 5,735,126 | A * | 4/1998 | Schulte-Werning | 60/732 |
| 6,253,555 | B1 * | 7/2001 | Willis | 60/737 |
| 6,405,536 | B1 | 6/2002 | Ho et al. | |
| 6,532,726 | B2 * | 3/2003 | Norster et al. | 60/39.281 |
| 6,895,756 | B2 * | 5/2005 | Schmotolocha et al. | 60/761 |
| 7,350,357 | B2 * | 4/2008 | Chen et al. | 60/737 |
| 2003/0172655 | A1 * | 9/2003 | Verdouw et al. | 60/737 |
| 2006/0260320 | A1 * | 11/2006 | Bertolotti et al. | 60/772 |
| 2007/0151248 | A1 * | 7/2007 | Scarinci et al. | 60/737 |
| 2008/0041060 | A1 * | 2/2008 | Nilsson et al. | 60/737 |
| 2008/0078182 | A1 * | 4/2008 | Evulet | 60/776 |
| 2009/0025395 | A1 * | 1/2009 | Nilsson et al. | 60/748 |
| 2009/0272117 | A1 * | 11/2009 | Wilbraham | 60/748 |
| 2009/0320485 | A1 * | 12/2009 | Wilbraham | 60/748 |

* cited by examiner

*Primary Examiner* — Louis Casaregola
*Assistant Examiner* — Michael B Mantyla
(74) *Attorney, Agent, or Firm* — Cantor Colburn LLP

(57) ABSTRACT

Disclosed is a cross flow apparatus including a surface and at least one outlet located at the surface. The cross flow apparatus further includes at least one guide at the surface configured to direct an intersecting flow flowing across the surface and increase a velocity of a cross flow being expelled from the at least one outlet downstream from the at least one outlet.

13 Claims, 4 Drawing Sheets

METHOD AND APPARATUS FOR AFFECTING A RECIRCULATION ZONE IN A CROSS FLOW

STATEMENT REGARDING GOVERNMENT INTEREST

The invention was made with government support under Contract No. DE-FC26-05NT42643 awarded by the United States Department of Energy. The government has certain rights in the invention.

BACKGROUND OF THE INVENTION

The subject matter disclosed herein relates generally to cross flow configurations. More particularly, the subject matter relates to fuel nozzles for gas turbine engines.

A jet in cross flow occurs when a flow of fluid exits an orifice to interact with an intersecting flow of fluid that is flowing across the orifice. Jets in cross flow are central to a variety of applications such as gas turbine combustors, fuel injectors and pollution control in smoke stacks. A jet in cross flow typically creates a zone of recirculation downstream from where the cross flow is introduced. The recirculation zone typically has a reduced flow velocity that may cause a variety of detrimental effects depending on the configuration of the flow in cross flow application.

Thus, an apparatus that reduces, eliminates, or otherwise alters the recirculation zone downstream of a flow in cross flow would be well received in the art.

BRIEF DESCRIPTION OF THE INVENTION

According to one aspect of the invention, a cross flow apparatus includes a surface, at least one outlet located at the surface, and at least one guide at the surface configured to direct an intersecting flow flowing across the surface and increase a velocity of a cross flow being expelled from the at least one outlet downstream from the at least one outlet.

According to another aspect of the invention, a combustor swozzle includes a swozzle vane having a surface, a cross flow outlet located at the surface, and a guide at the surface configured to direct an intersecting flow flowing across the surface and increase a velocity of a cross flow being expelled from the outlet downstream from the outlet.

According to yet another aspect of the invention, a method for combining a plurality of flows includes flowing a first flow of a first fluid across a surface, expelling a second flow of a second fluid from an opening in the surface into the first flow, guiding at least one of the first flow and the second flow and increasing a velocity of the second flow in a region downstream from where the second flow is expelled.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

A detailed description of the hereinafter described embodiments of the disclosed apparatus and method are presented herein by way of exemplification and not limitation with reference to the Figures.

Figure 1:
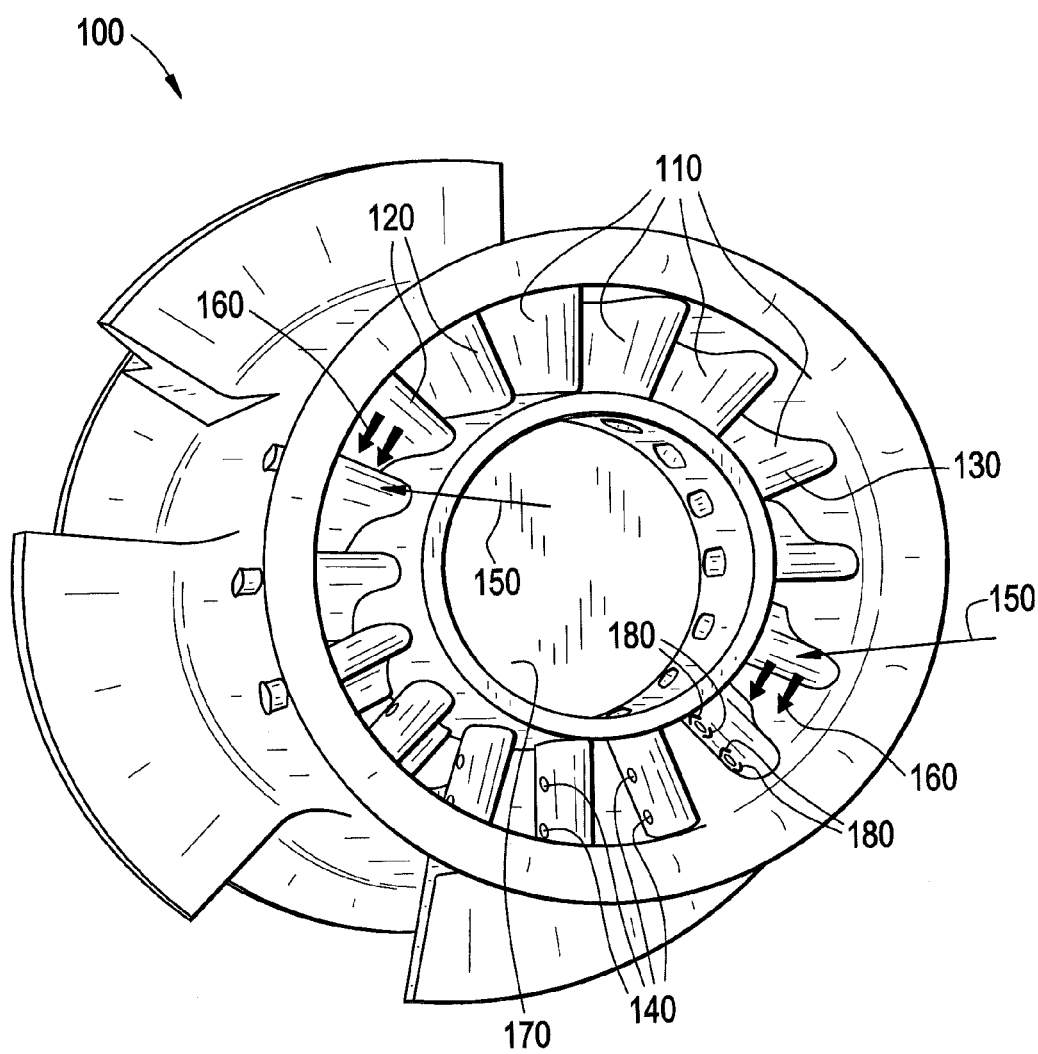
FIG. 1 depicts a perspective view of a combustor swozzle according to one embodiment of the present invention.

Referring to FIG. 1, there is shown a combustor swozzle 100 with a plurality of swozzle vanes 110, each of the swozzle vanes 110 having a leading edge 120 and a surface 130. The surface 130 has at least one cross flow outlet 140 thereon with two being illustrated in the Figure. During the combustion process in a gas turbine, a first flow 150 of compressed airflow approaches the leading edge 120 of the swozzle vane 110 and flows across the surface 130. A second flow 160 of combustor fuel is provided by a fuel chamber 170 and is thereafter expelled from the cross flow outlet 140 at an intersecting angle to the first flow 150. The swozzle vanes 110 may or may not be curved in profile up to ninety degrees downstream from the cross flow outlet 140 in order to mix and swirl the combination of the two flows 150, 160. A combustor (not shown) is thereafter receptive of the combination of the two flows 150, 160. On the surface 130 of at least one of the swozzle vanes 110 is at least one guiding portion 180, discussed herein. The guiding portion 180 is configured to direct the first flow 150 and thereby increase a velocity of the second flow 160 downstream from the cross flow outlet 140. This increased velocity reduces a zone of recirculation thereby decreasing flame holding therein. An embodiment disclosed herein is described by way of example with respect to a cross flow configuration on the surface 130 of the swozzle vane 110, but may be applied to any other cross flow configuration.

Figure 2:
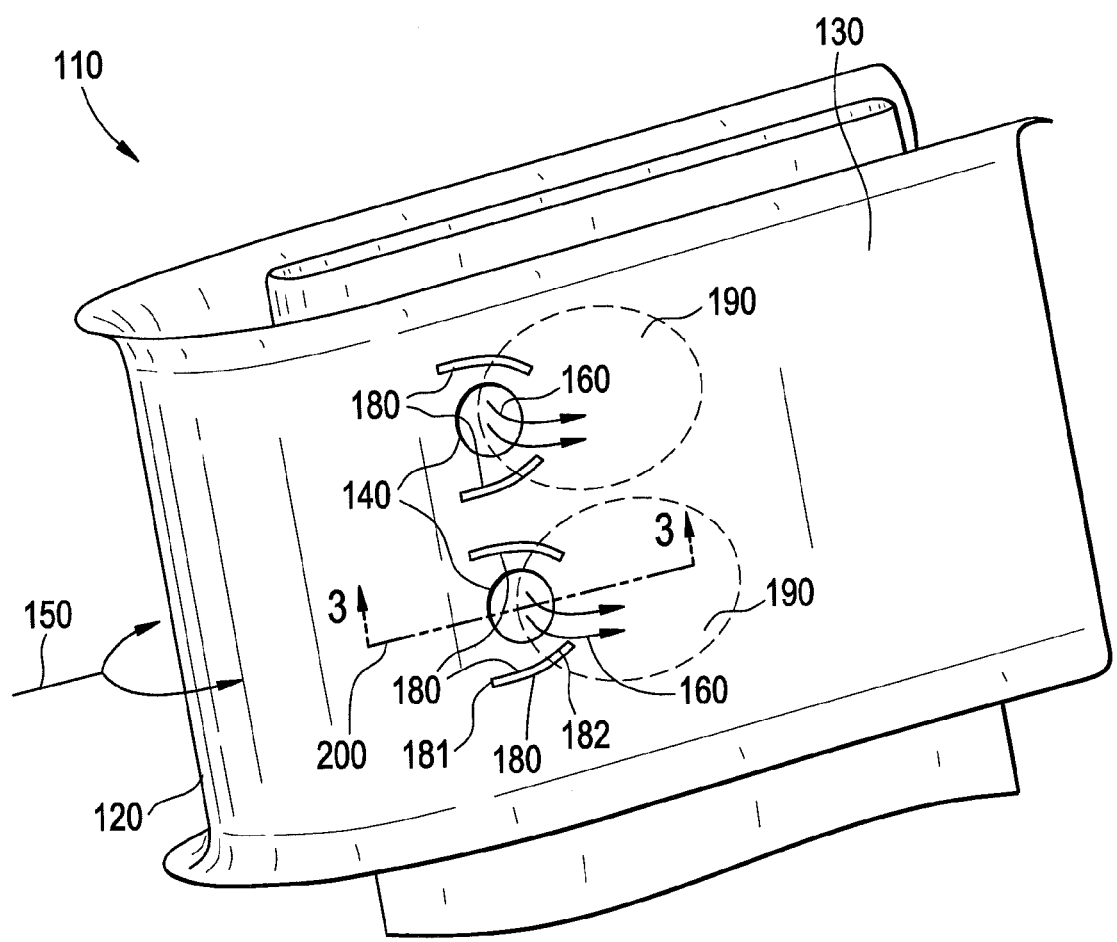
FIG. 2 depicts a perspective view of a swozzle vane in accordance with an embodiment of the present invention.
Figure 3:
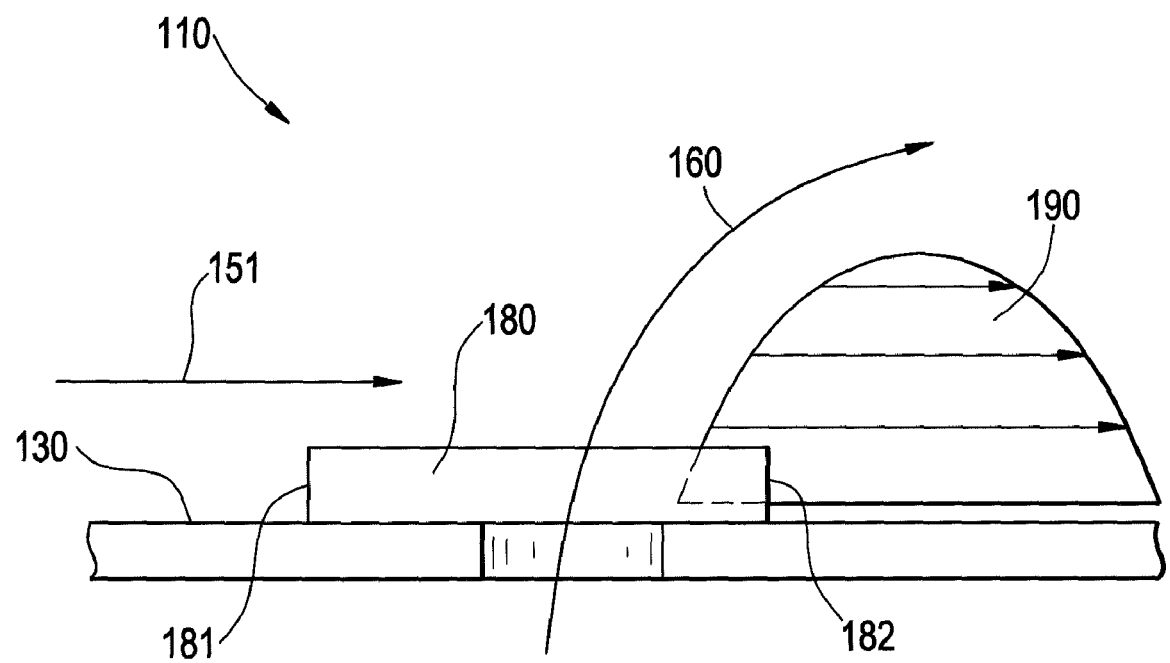
FIG. 3 depicts a cross sectional view of the swozzle vane of FIG. 2 taken at arrows 3-3.

Referring to FIGS. 2 and 3, the swozzle vane 110 is shown having the first flow 150 approaching the leading edge 120 that splits the first flow 150 into two flows. A portion of the first flow 150 flows across the surface 130 of the swozzle vane 110 shown in the Figures, while another portion of the first flow 150 flows across an antipodal surface (not shown) of the swozzle vane 110. The first flow 150 may be composed of compressed airflow as described hereinabove, but may alternately have flow and compositional properties of any type of intersecting flow that is configured to surround and intersect a cross flow. Regardless of the compositional properties of the intersecting flow 150, it is configured to flow across the cross flow outlets 140 on the surface 130 of swozzle vane 110.

In contrast, the cross flow outlets 140 are openings in the surface configured to expel the second flow 160 at an intersecting angle to the first flow 150. In one embodiment, the second flow 160 is a jet of a combustible fuel such as gasoline, natural gas, propane, diesel, kerosene, E85, biodiesel, biogas, or by any other fuel used for combustion. In another embodiment, the second flow 160 is any other flow of gaseous or liquid substance or combination thereof. Thus, it will be understood that the second flow 160 may have flow and compositional properties of any type of a cross flow introduced into a cross flow. Two of the cross flow outlets 140 are shown on the surface 130, each expelling the second flow 160. Each of the cross flow outlets 140 is shown herein to be generally circular. Alternately, the cross flow outlet 140 may be ovular, polygonal or curved in shape, or a combination thereof. Further, it will be understood that one or more of the cross flow outlets 140 may also be included on the antipodal surface of the swozzle vane 110 in a similar configuration to the cross flow outlets 140 located on the surface 130.

The swozzle vane 110 further includes at least one guiding portion 180, with two being illustrated about each one of the cross flow outlets 140. The guiding portion 180 is a guide that is configured to redirect the flow of at least one of the first flow 150 and the second flow 160. This redirection increases the velocity of the flow in a downstream region 190, the downstream region 190 located downstream from the cross flow outlet 140. This redirection further prevents both flame holding in the downstream region 190 and reduces a recirculation zone from forming in the downstream region 190. Furthermore, the guiding portion 180 increases the penetration height of the second flow 160 into the first flow 150 carrying the second flow 160 further the surface 130. This is useful in dispersing the fluid of the second flow 160 within the stream of the first flow 150.

In one embodiment, the guiding portion 180 further includes an upstream end 181 and a downstream end 182. In this embodiment, the upstream end 181 is located farther than the downstream end 182 from a parallel flowline 200 that intersects the middle of the cross flow outlet 140 and is oriented parallel to the flow of the first flow 150. The guiding portion 180 is also curved around the cross flow outlet 140. In another embodiment, rather than being curved, the guiding portion 180 instead has a straight profile. In yet another embodiment, the guiding portion 180 has two or more straight sections.

Although the guiding portion 180 illustrated herein is a protruding vane, the guiding portion 180 in alternate embodiments may be a negative impression or groove formed in the surface 130 around the cross flow outlet 140. In the case of a protruding guiding portion 180, the height of the guiding portion 180 normal to the surface 130 increases from upstream to downstream in one embodiment. In the case of a negative impression groove, the depth of the groove increases from upstream to downstream in one embodiment. It should be understood that the height and depth of the guiding portion is not limited to these embodiments but may remain constant or have any other configuration. Furthermore, depending on the embodiment, there may be a plurality of the guiding portions 180 located about each of the cross flow outlets 140. In the illustrated embodiment, two of the guiding portions 180 are used for each cross flow outlet 140, one on each side of the cross flow outlet 140.

Figure 4:
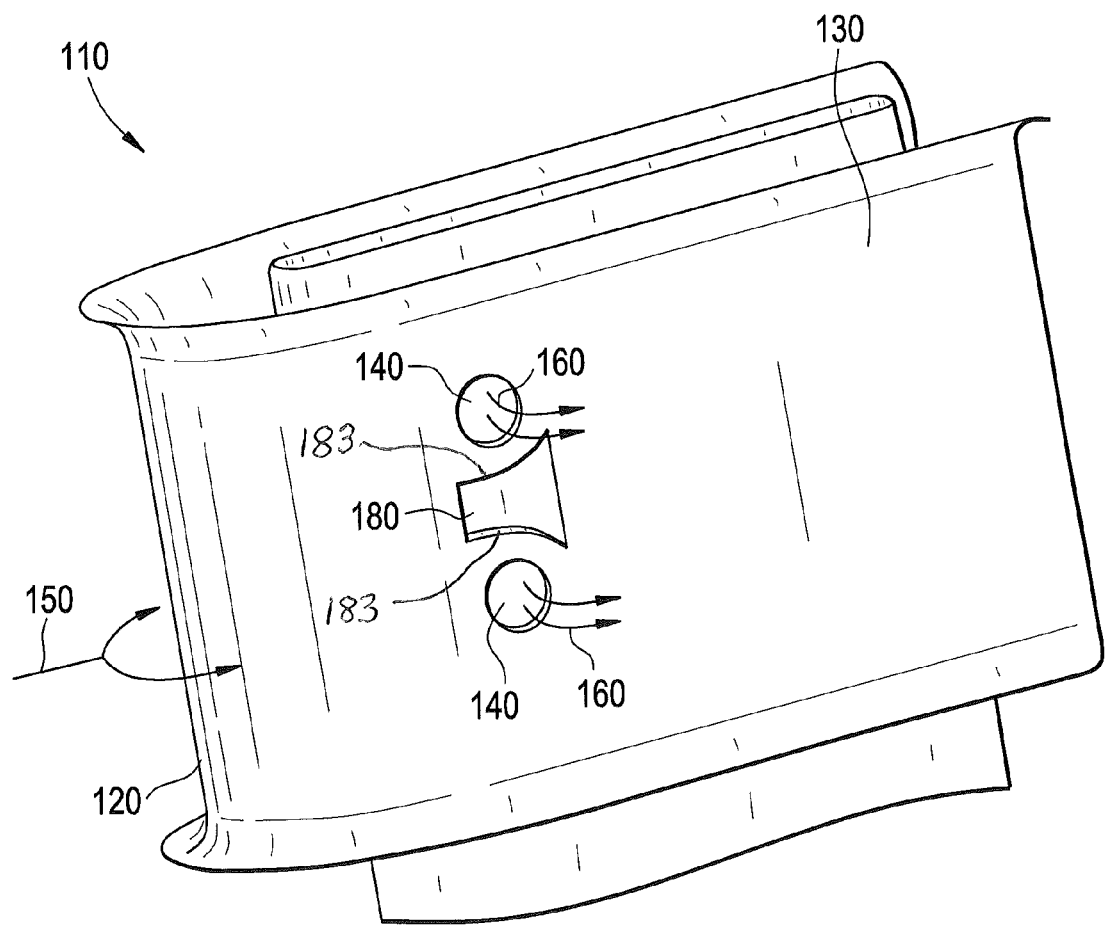
FIG. 4 depicts a perspective view of a swozzle vane in accordance with another embodiment of the present invention.

Additionally, as depicted in FIG. 4, a single of the at least one guiding portion 180 may be configured to increase the velocity of two or more of the second flows 160, with two being illustrated in the Figure. In this embodiment, the single guiding portion 180 may be located between two or more of the cross flow outlets 140. The single guiding portion 180 may be a portion of sheet metal having two guiding walls 183. Each of the guiding walls 183 may have a profile and orientation similar to one of the protruding vanes in the previous embodiment described hereinabove. However, each of the two guiding walls 183 is configured to direct the first jet 150 to a position behind a separate one of the at least one cross jet outlets 140. It should be understood that these embodiments exemplify the guiding portion 180, but the guiding portion 180 is not limited to these embodiments.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cross flow apparatus comprising:
a swozzle vane having a surface;
at least one outlet located at the surface; and
at least one curved guide protruding from the surface having an upstream end and a downstream end, the upstream end being located farther from a line than the downstream end, the line intersecting the middle of the at least one outlet, the at least one curved guide being curved such that distances between the at least one curved guide and the line vary in a nonlinear relationship, the at least one curved guide being configured to direct an intersecting flow flowing across the surface and increase a velocity of a cross flow being expelled from the at least one outlet downstream from the at least one outlet, the surface extending around the curved guide.

2. The cross flow apparatus of claim 1, wherein the at least one guide is a protruding vane.

3. The cross flow apparatus of claim 1, wherein the at least one guide is a groove in the surface.

4. The cross flow apparatus of claim 1, wherein the at least one guide is two guides for each of the at least one outlet and the two guides are on opposing sides of the cross flow.

5. The cross flow apparatus of claim 1, wherein the at least one guide is configured to increase a penetration height of the cross flow further from the surface.

6. The cross flow apparatus of claim 1, wherein the cross flow includes combustible fuel.

7. The cross flow apparatus of claim 1, wherein the intersecting flow is compressed air.

8. The cross flow apparatus of claim 1, further comprising a combustor receptive to the combination of the cross flow and the intersecting flow.

9. The cross flow apparatus of claim 1, wherein at least one of the at least one guide is configured to increase the velocity of a plurality of cross flows.

10. A combustor swozzle comprising:
a swozzle vane having a surface;
an outlet located at the surface; and
a pair of curved guides at the surface flanking the outlet configured to direct an intersecting flow flowing across the surface and increase a velocity of a cross flow being expelled from the outlet downstream from the outlet, a distance between the pair of guides varying nonlinearly along a direction of the intersecting flow, the surface extending around the pair of curved guides.

11. The combustor swozzle of claim 10, wherein the swozzle vane has two antipodal surfaces, each of the surfaces having at least one outlet.

12. The combustor swozzle of claim 10, wherein the swozzle vane has a curved profile.

13. The combustor swozzle of claim 10, further comprising a plurality of swozzle vanes.

* * * * *